Nov. 22, 1949        L. VAVRIK        2,488,947
ROTARY POWER HANDSAW
Filed May 28, 1945        4 Sheets—Sheet 1
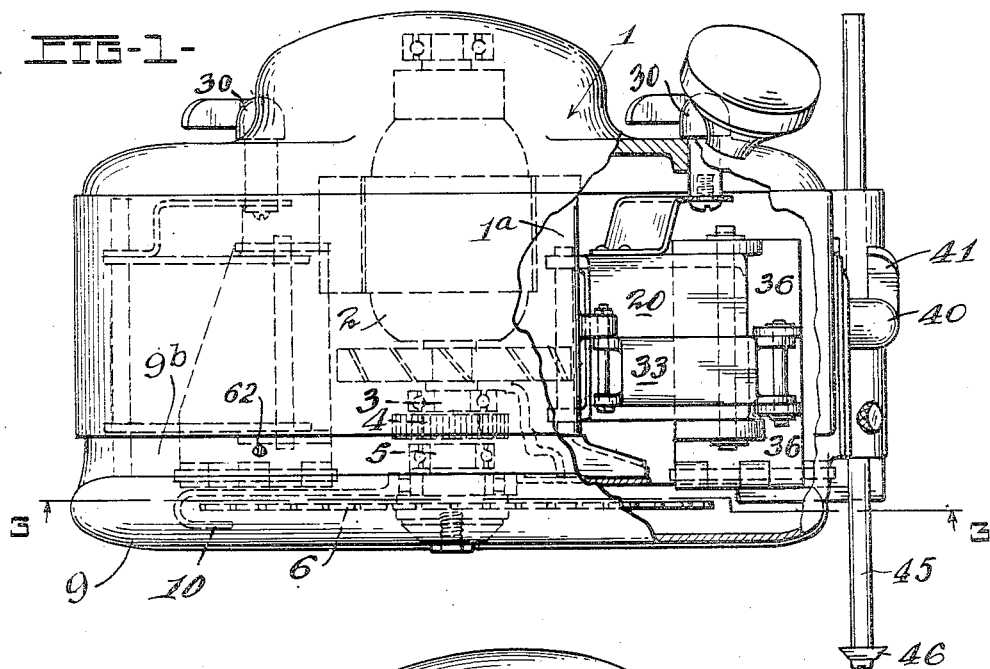
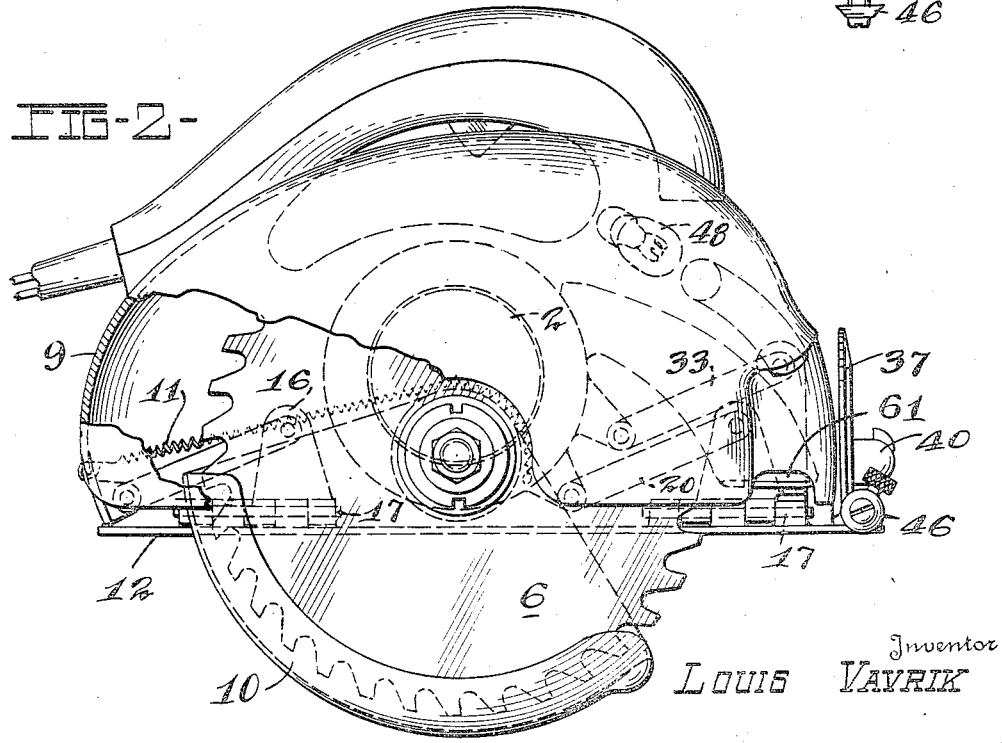
Inventor
LOUIS VAVRIK
By Owen & Owen
Attorneys.

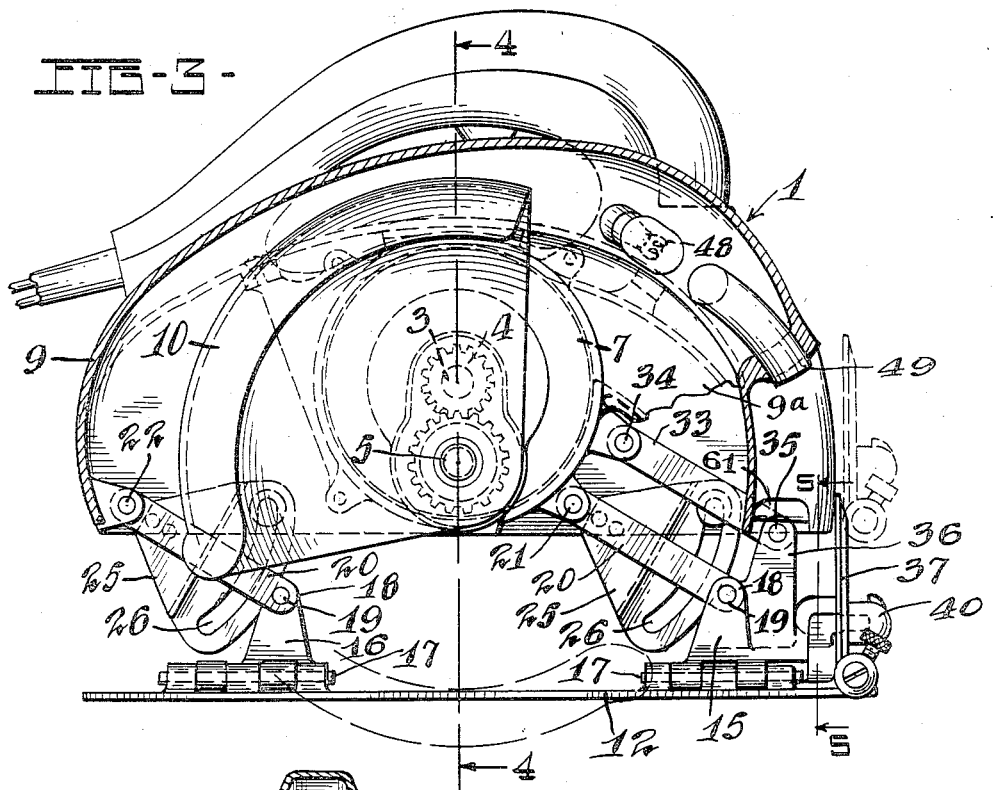
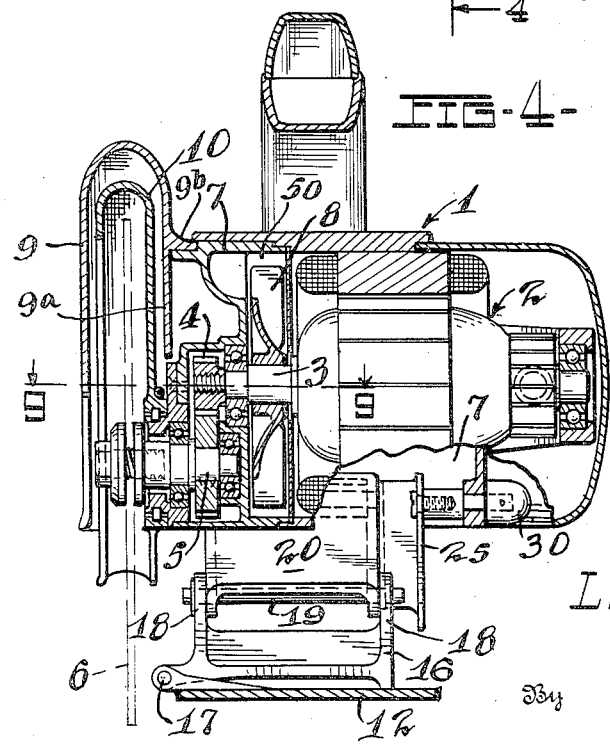
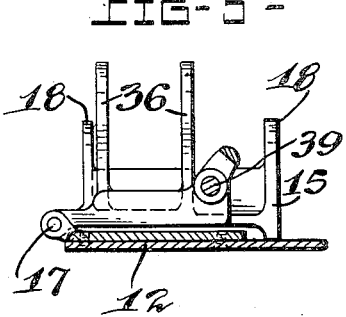

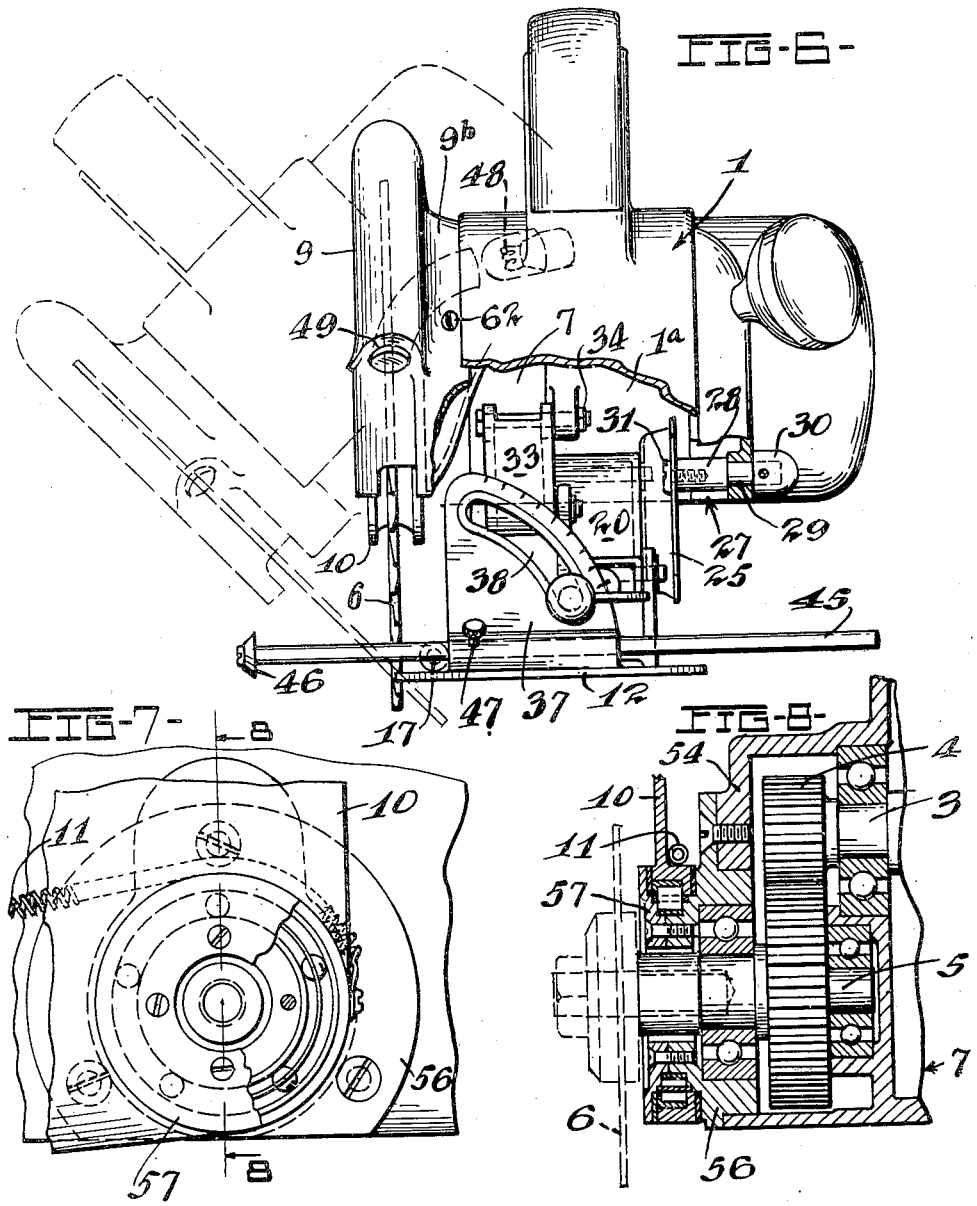

Nov. 22, 1949     L. VAVRIK     2,488,947
ROTARY POWER HANDSAW
Filed May 28, 1945     4 Sheets-Sheet 4
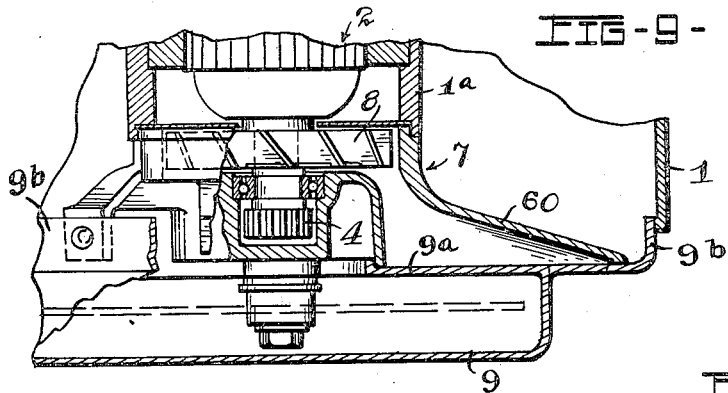
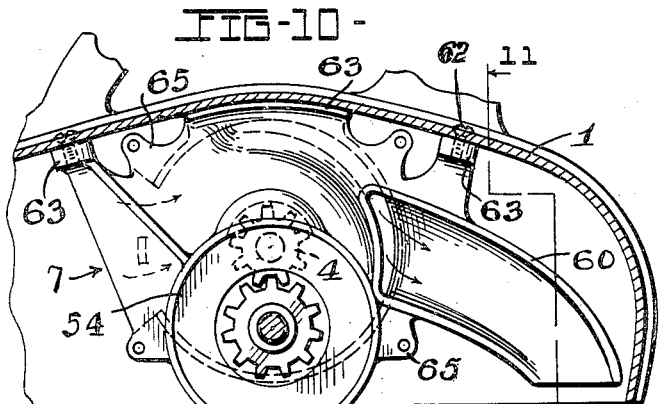
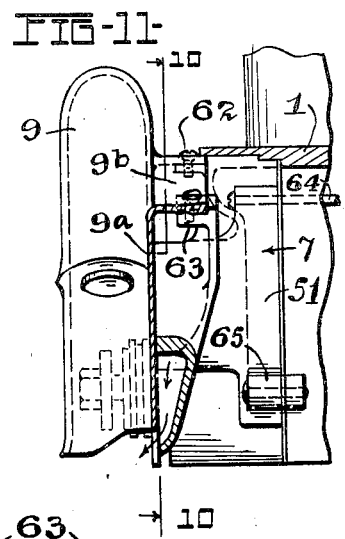
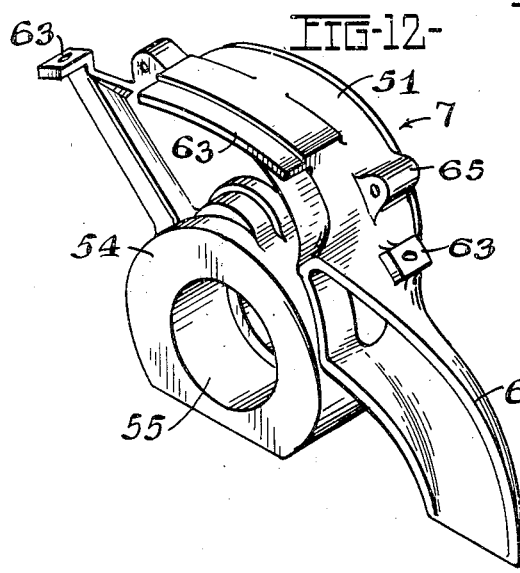
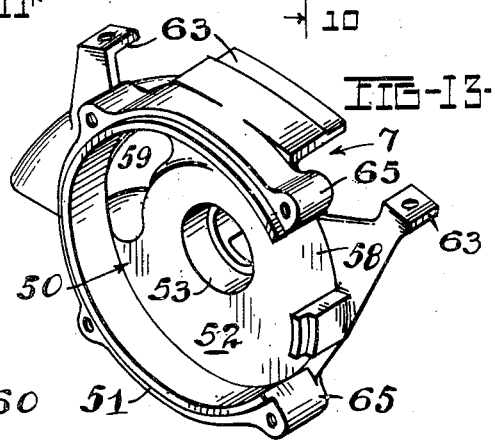
Inventor
LOUIS VAVRIK
By Owen & Owen
Attorneys Patented Nov. 22, 1949

2,488,947

UNITED STATES PATENT OFFICE 2,488,947

ROTARY POWER HANDSAW

Louis Vavrik, Rossford, Ohio, assignor to The American Floor Surfacing Machine Company, Toledo, Ohio, a corporation of Ohio Application May 28, 1945, Serial No. 596,168

4 Claims. (Cl. 143—43)

This invention relates primarily to rotary hand saws of the portable type, and particularly to mounting means therefor to permit various adjusting movements of the saw relative to an attached support and to the work to be acted on.

In saws of this character it is found desirable to tilt the saw blade relative to the support or work to permit a cut on a bevel or incline, and also to raise and lower the saw relative to the support or work to vary the permissible depth of cut.

An object of this invention is the provision in a saw of the character described, of improved mounting means for the saw constituting an attachment thereto and operable to raise or lower the saw relative to a support to vary the depth of cut.

Another object of the invention is the provision in a saw of the character described, which has a tiltable mounting feature, of means associated therewith and operable to adjust the saw relative to said mounting feature in any position of tilting adjustment thereof to vary the permissible depth of cut of the saw member.

Another object of the invention is the provision in combination with a portable frame carrying a rotary saw and a base mount therefor, the latter for resting on a work-piece to be cut, of a connection between said frame and mount operable to place and secure the saw in various positions of adjustment, one of which may be angular in a plane longitudinal to the saw axis and the other in a plane transverse to said axis, whereby both tilting and depth cutting adjustment of the saw may be effected in a simple and efficient manner.

Another object of the invention is the provision, in connection with a saw of the class described, of a novel housing construction for the cooling fan and the saw driving gearing whereby to enhance the practicability and efficient operation of the saw.

Other objects and advantages of the invention will be apparent from the following detailed description and from the accompanying drawings illustrating one embodiment thereof, in which—

Fig. 1 is a top plan view of a machine embodying the invention, with a part broken away; Fig. 2 is a right side elevation thereof with a part broken away; Fig. 3 is a view similar to that of Fig. 2 with a part of the frame casing in vertical longitudinal section on the line 3—3 in Fig. 1, with the frame in raised relation to the base mount to lessen the depth of saw cut, the saw guard raised and parts in full; Fig. 4 is a vertical cross-section on the line 4—4 in Fig. 3; Fig. 5 is a fragmentary section on the line 5—5 in Fig. 3; Fig. 6 is a front elevation of the machine in extended form, as in Fig. 3, with parts broken away and with the tilted position of the saw frame shown in dotted lines; Fig. 7 is an enlarged fragmentary view, with parts broken away, showing the saw guard mounting; Fig. 8 is a fragmentary section on the line 8—8 in Fig. 7; Fig. 9 is an enlarged fragmentary section, with parts in full, taken on the line 9—9 in Fig. 4; Fig. 10 is a vertical section on substantially the line 10—10 in Fig. 11, with parts in full; Fig. 11 is a vertical section on substantially the line 11—11 in Fig. 10; Fig. 12 is a perspective outer side view of the housing unit for the fan and the saw gearing, and Fig. 13 is a perspective inner side view of such unit.

Referring to the drawings, 1 designates the body frame of a machine embodying the invention and which, in the present instance, houses an electric motor 2 the armature shaft 3 of which is normally in horizontal or reclining position and has a geared connection 4 with a shaft 5 carrying a rotary saw blade 6.

The frame 1 is of hollow elongated form with its top closed and its bottom terminating in a plane substantially parallel to said shafts and open. A frame unit 7 for housing the two shafts 3, 5, the gearing 4 and a rotary fan 8 is provided in a side of the body frame 1 (Fig. 4), and on the outer end of this unit is mounted a saw housing 9 which is open at its bottom with its skirt edge terminating a short distance below the saw axis and in substantially the bottom plane of the frame 1. The frame unit 7 will later be more fully described. A segmental guard 10 for the saw is mounted for free rotary movements on a hub part of the frame unit 7 around the bearing for the shaft 5 concentric therewith. This guard is biased to turn in counterclockwise direction (Fig. 2) by a spring 11, one end of which is anchored to and wrapped partially around the hub portion of the guard, while its other end is anchored to the housing 9. The normal position of the guard is in guarding relation to the exposed lower edge portion of the saw blade as shown in Fig. 2. This guard is moved rearwardly and upwardly within the housing 9 by the adjacent work and as the saw advances therein, as well understood in the art.

The frame 1 is provided at its bottom with a base plate 12 which is preferably coextensive in length with the length of such frame and extends a distance inward from the edge thereof that is adjacent to the saw. This plate is adapted to substantially close the open bottom of the frame 1 and is connected thereto, both for tilting adjustment in a plane axial to the saw shaft and for bodily adjustment toward and away from the frame in a plane substantially normal to the shaft axis, by means that will now be described.

Mounted on the base plate 12 near its ends and disposed transversely thereof are front and rear cradles 15 and 16, respectively, each hinged at its outer end edge to the outer side edge of the plate at 17 to adapt the plate to be tilted in a plane transverse thereto or longitudinally to the axis of the saw. The cradles 15 and 16 are superposed on and provide the base 12 with an inner base structure and each cradle has a pair of upstanding lugs 18 connected by a bearing pin 19, and this pin pivotally supports one end of a respective link 20 which is of broad form with a spaced double bearing on the pin to hold it against twisting or lateral wobbling movements relative to the cradle. The links 20 project rearwardly from the respective cradles in parallel relation, with the front link pivotally connected to a cross-pin 21 on the adjacent lower portion of the bearing frame unit 7 and with the rear link pivotally connected to a cross-pin 22 at the lower rear skirt edge portion of the frame 1, as shown in Figs. 2 and 3. The axes of the cradle pins 19 and of the frame pins 21 and 22 are in planes parallel to each other and these axes are also in planes parallel to the base plate 12 when the latter is in normal non-tilted relation to the body frame. It is apparent that with this arrangement the links 20 provide a parallelogram connection between the cradles and frame, permitting adjusting movements of the body frame toward and away from the two cradles and consequently the base plate 12, with the bottom edge of the frame and the base plate remaining longitudinally in parallel relation. At the same time the frame and its plate may have relative transverse tilting movements in a plane parallel to the axis of rotation of the saw without regard to the relative positions of adjustment thereof by movement of the links 20.

The permissible arcuate movements of the pins 21 and 22 are in a generally normal plane to the plate 12 and of substantially equal length at each side of a horizontal plane parallel to and intersecting the axes of the pins 19. This is illustrated by a comparison of the showing of Figs. 2 and 3. The links 20 forming the radii of such movements are of such lengths that very little longitudinal movement is imparted to the frame relative to the base plate during a maximum spacing adjustment of the two, which is sufficient to protract or retract the saw relative to the plate to suit a desired depth of cut.

Fixed to each link 20 is a plate 25, in the present instance of segmental form, that is provided with an arcuate slot 26 concentric to the axis of the associated pin 21, 22. A manually operable clamp 27 (Figs. 1, 4 and 6) is carried by the lower edge portion of the body frame 1 for each plate 25 and has cooperating engagement with its slot to limit the permissible adjusting movements of such frame and to clamp the plate to lock the parts in any position of adjustment. This clamping means, in the present instance, comprises a stud 28 rotatably carried by but projecting inwardly from a bearing 29 in the frame and carrying a control handle 30 in accessible position at the outer side of the frame. The stud 28 abuts at its free end against a side of the respective plate 25 and is clamped thereto by a screw 31 which is threaded therein with its shank projecting through the plate slot and its head engaging the plate in opposition to the stud. A turning of the stud 28 is relative to the screw 31 and effects a release or a clamping engagement of the plate 25. The screw 31 is held in any suitable manner against turning relative to the plate, as for instance by having a flat portion in engagement with a side wall of the slot.

A second link connection 33 is provided between the frame 7 at one side and the cradle 15 to cooperate with the links 20 to cause them to have true parallel movements and to maintain the lower edge of the body frame 1 and the plate 12 in longitudinal parallel relation. The link 33, in the present instance, is connected at its inner end to a pivot pin 34 on the frame 7 and at its outer end to a pivot pin 35 mounted in and connecting a pair of lugs 36 rising from the cradle 15.

The control means for the tilting adjustment of the plate 12 includes a plate 37 fixedly rising from the forward end of the base plate 12 crosswise thereof and having an arcuate slot 38 (Fig. 6) therein concentric to the tilting axis of the plate 12. A stud 39 (Fig. 5) on the cradle 15 projects forwardly therefrom through the slot 38, and a clamping nut 40 is threaded on the outer end of this stud for clamping engagement with the plate 37 in opposition to an abutting surface on the cradle at the base of the stud. The nut 40 has a handle 41 projecting therefrom to facilitate turning.

A width gauge for the saw comprises a rod 45 inserted through an opening in the base of the plate 37 transverse to the base plate 12 and carries at one end a line following member 46. This rod is secured in adjusted position by a screw 47.

An incandescent lamp 48 (Figs. 2, 3 and 6) is mounted within the frame 1 and light therefrom is directed to a point in advance of the line of cut of the saw through an angular light transmitting rod 49 of "lucite" or other suitable plastic material.

The frame unit 7 forms a chamber 50 (Figs. 4 and 13) at its inner side for the fan 8 and for such purpose is provided at such side with a cylindrical flange 51 which has a bearing in the adjacent end of the cylindrical portion 1ᵃ (Fig. 6) of the body frame concentric to the axis of the motor shaft 3. The outer wall 52 of the chamber 50 has a central opening 53 for receiving a bearing for the motor shaft 3, and the unit 7 at the outer side of this opening is provided with an extension 54 (Fig. 12) forming a housing for the gearing 4, and also a bearing opening at its inner side for the shaft and at its outer side an opening 55 through which the outer end of the shaft 5 projects and in which a bearing frame 56 (Fig. 8) for the shaft is mounted. The frame 56 cooperates with an outer ring plate 57 to form a hub on which the saw guard 10 is mounted for rotary movements through the medium of a suitable anti-friction bearing. Air may be admitted to the chamber 50 through one or more openings 58 in one side portion thereof, while the discharge from such chamber is through an opening 59 in its wall 52 and thence through a conduit, formed by the unit extension part 60 (Figs. 9 and 10) and the inner side wall of the fan housing 9, to a point 61 (Fig. 2) where it discharges laterally across the top of the work in advance of the saw 6. The saw housing 9 at its inner side has a flange or wall 9ᵃ (Figs. 9 and 11) which bears against and closes the open outer side of the conduit part 60 except at its discharge end. The housing 9 has a flange 9ᵇ projecting from its inner side and engaging over and secured by screws 62 to supporting brackets 63 on the unit 7. This flange has inner lapping coaction with the adjacent edge of the body frame 1 to form a joint therewith. The frame unit 7 is attached to the body frame 1 by tie bolts or screws 64 extending through bosses 65 on the flange 51 and engaging registering parts of the body frame (Figs. 10 to 13).

It will be understood that in the use of the saw, the plate 12 slidingly rests on the work to be sawed at one side of the saw blade and the depth of cut may be easily and quickly varied by simply releasing the clamps controlled by the handles 39 and then raising or lowering the body frame 1 the desired extent with respect to the base plate 12, after which the clamps are again tightened to hold the parts in adjusted relation. In this adjustment the bottom edge of the frame remains substantially parallel to the base plate 12 longitudinally thereof. If a tilting adjustment is desired so as to obtain a beveled or inclined cut of desired angle to the plate 12, the clamping nut 40 is loosened to permit a tilting of the frame the desired extent relative to the base plate, after which the nut is tightened to retain the parts in adjusted position.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a machine of the class described, a body frame having its bottom side open, a motor mounted in said frame, a rotary saw driven by said motor at a side of the frame with its axis of rotation transverse to the frame and its lower edge projecting therebelow, a base plate below the frame, a second base structure superposed on said plate and pivotally connected thereto along a side edge thereof for transverse tilting movements relative thereto within the vertical plane of the plate and frame, the open bottom of said frame being adapted to be closed by said plate and base structure, a parallel link connection between said second base structure and said frame permitting relative parallel raising and lowering movements of the frame relative to the base structure and enclosed within the frame when the bottom is closed, and separate means for holding said frame and base structure and said base structure and plate in respective adjusted relation.

2. In a machine of the class described, a base plate, a super structure mounted on said plate and hinged thereto for transverse swinging adjustment relative thereto in the vertical plane of the plate, a body frame mounted over said plate and super structure including a handle on its top and having a transverse cylindrical portion below the handle intermediate its ends, an electric motor mounted in said cylindrical portion with its rotor axis transverse to the frame, a saw mounted at a side of said frame and driven by said motor with its axis of rotation parallel to that of the motor and with its lower edge projecting below the base plate, connecting means between said super structure and frame for permitting parallel raising and lowering movements of the frame relative to the base structure, said connecting means being enclosed within the base portion of the frame when the frame is in lowered position on the base structure, and separate means for holding said frame and base structure and said base structure and plate in respective adjusted relation.

3. In a machine of the class described, a body frame forming a housing with an open bottom, a base plate adapted to form a closure for the open bottom of the frame, a super structure mounted on said plate and having hinged connection with a side edge thereof to permit lateral tilting adjustment of one relative to the other, link means connecting said super structure and the frame through the open bottom of the latter permitting parallel inward and outward adjusting movements of the frame relative to said plate and super structure, said frame when lowered adapted to substantially enclose said super structure and frame connecting means, and separate means for holding said frame and super structure and said super structure and base plate in respective adjusted relation.

4. In a machine of the class described, a frame forming a hollow housing with an open bottom and having a handle on its top, a motor mounted in said housing substantially midway of its ends and having its shaft transverse to the housing, a rotary saw disposed at a side of the housing and connected to and driven by the motor with its axis of rotation parallel to the motor axis, a base plate adapted to close the bottom of the housing, a connection between the base plate and housing through its open bottom adjustable to permit adjustment of the housing toward and away from the base plate in parallel relation thereto and also tilting adjustment of the housing transverse to the base plate, separate means operable to maintain the respective adjustments of said housing and base plate, said connection between the housing and base plate comprising a super structure mounted on the base plate for transverse pivotal adjustment relative thereto, and a plurality of parallel links connecting the housing interiorly thereof and said super structure to permit parallel adjustment of the housing toward and away from said super structure.

LOUIS VAVRIK.

REFERENCES CITED

The following references are of record in the file of this patent:

UNITED STATES PATENTS

| Number | Name | Date |
|---|---|---|
| 733,744 | Raettig | July 14, 1903 |
| 1,102,018 | Dodds | June 30, 1914 |
| 1,478,569 | Kraber | Dec. 25, 1923 |
| 1,706,115 | Hannah | Mar. 19, 1929 |
| 1,708,345 | Wodack et al. | Apr. 9, 1929 |
| 1,787,191 | Fisk | Dec. 30, 1930 |
| 1,830,579 | Wappat | Nov. 3, 1931 |
| 1,833,785 | Krieger | Nov. 24, 1931 |
| 1,848,330 | Emmons | Mar. 8, 1932 |
| 1,854,510 | Haas | Apr. 19, 1932 |